United States Patent Office 2,767,097
Patented Oct. 16, 1956

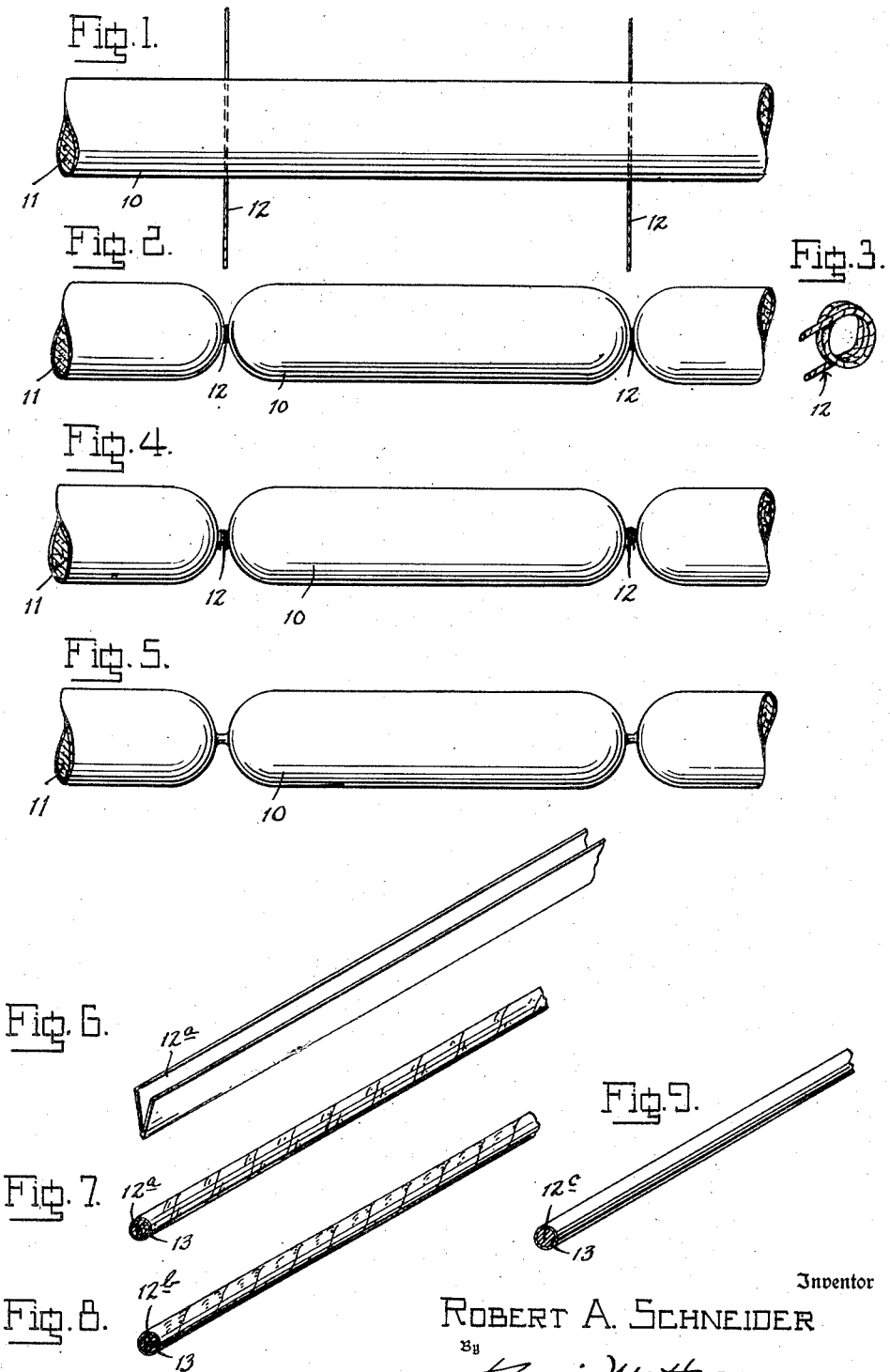

2,767,097
METHOD OF FORMING A LENGTH OF LINK SAUSAGE AND PRODUCT

Robert A. Schneider, Bridgeport, Conn.

Application August 31, 1950, Serial No. 182,440

3 Claims. (Cl. 99—109)

The present invention relates to improved tie string for tying link sausage and structurally like products and method of tying and removing the same, and the present application is a continuation-in-part of my co-pending application for Process and Apparatus for Removing the Casing of Link Sausage and Structurally Like Products, Ser. No. 136,264, filed December 31, 1949 now Patent No. 2,644,982 wherein there is disclosed a tie string formed of a material capable of disintegrating or stretching to a high degree when wet, such material being for instance cellulose string.

In the manufacture of link sausage the ground meat or other ingredients of the sausage is forced into an elongated tubular skin or casing which is then tied or constricted at intervals to produce the links, the length of link sausage thus formed being htereupon smoked or otherwise processed, which has the effect of permanently setting or solidifying the shape of the sausage links. The smoked length of link sausage is then cooked by steam.

The operation of filling the skin or casing and forming the links by tying is a wet operation carried out under normal room temperature conditions with relatively cold water having the temperature as supplied from the usual city faucet, that is of the order of about 40° F. The smoking of the sausage is a dry operation under temperatures sufficient to raise the internal temperature of the sausage to about 140° F., and the steam cooking of the sausage is again a wet operation under temperatures sufficient to raise the internal temperature of the sausage to about 160° F., the superficial steam temperatures being approximately 212° F.

The casings employed have either been natural casings, that is casings processed from the intestines of meat animals, or synthetic casings formed of regenerated cellulose or other suitable materials and having characteristics substantially similar to natural casings. The natural casings are edible, and for the most part it is customary to leave such casings on the sausage. However, in the case of synthetic casings, it is desirable that they be removed. The process of removing the casings has consisted in the slitting and peeling of the casings from the sausage links, and this has been carried out manually and in various types of machines, but, whatever the method, it has first been necessary to remove the tie strings between the links. This is usually done manually which is costly, time-consuming, and contrary to the best sanitary practices because of the necessity for manual handling of the product.

It is proposed, according to the invention, to provide a tie string formed of a suitable material which is capable of rapidly disintegrating when wet. Because the operation of filling and tying the sausage links is a wet operation it is necessary that the tie string be such that it will not disintegrate during this operation, as it is the essential function of the string to hold the shape of the links until such shape is permanently set by the smoking operation. It is, therefore, proposed to provide a string having a body capable of disintegrating when wet, and provided with a protective coating to prevent water or moisture from reaching the body of the string during the operation of filling the casing and tying the links. It is further proposed to provide such coating of a suitable substance capable of melting, dissolving or otherwise eliminating its effectiveness as a protective coating for the body of the string when subjected to further processing after the shape of the links is permanently set, as for instance when subjected to the high temperature and moisture present in the steam cooking operation, the body of the string being thus exposed to moisture so that it will disintegrate.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a plan view, partially broken away, of a length of filled sausage casing showing the relation of two tying strings preparatory to tying the ends of a sausage link.

Fig. 2 is a similar view showing the ends of the link tied.

Fig. 3 is an enlarged perspective view showing the manner in which the tying string is looped to form the tie.

Fig. 4 is a plan view showing the link sausage following the step of smoking.

Fig. 5 is a similar view showing the link sausage following the step of steam cooking.

Fig. 6 is a perspective view of a length of folded paper as used for forming the twisted paper string.

Fig. 7 is a perspective view showing the twisted paper string provided with a protective coating.

Fig. 8 is a perspective view of a modified form of string having a body formed of spun and twisted fibers and provided with a protective coating.

Fig. 9 is a perspective view of another modified form of string having a body consisting of a continuous filament and provided with a protective coating.

Similar reference characters indicate corresponding parts throughout the several figures of the drawings.

Referring to the drawings, the casing 10 is filled in the usual manner with the sausage filling 11, and is thereupon tied at suitable intervals to produce links, the links being produced by tying strings 12 at the ends of each link. These strings are tied in the usual manner, that is they may be hand-tied or they may be automatically tied in a so-called linker machine, for example, of the types shown in the patent to Demarest, et al. No. 2,307,-361, dated January 5, 1943, assigned to Automatic Linker, Inc., Newark, New Jersey, and as shown in the patent to Noe, No. 2,510,997, dated June 13, 1950, assigned to Kidde Manufacturing Co., Inc., Bloomfield, New Jersey.

The form of the tie is simply a series of turns of a short length of string which constricts the casing as shown in Fig 2, the tight packing of the filling within the casing being such that the ends of two adjacent links form an annular crease which presses at its sides against the string sufficiently to hold it tightly in its looped form. This step of filling the casing and tying the links is carried on at ordinary room temperature and is a relatively wet operation, that is the casing is kept wet to facilitate filling and tying, and for sanitary reasons the filling tables and apparatus are continuously drenched with water, this water being at a relatively cool temperature as received from the city supplied faucet, that is of the order of about 40° F.

According to the invention the body of the tying string 12 is formed of a suitable material which will disintegrate when it is saturated or partially saturated with moisture, an example of such material being paper string formed of cellulose wood fibers. This type of paper string is formed from a length of paper 12a folded longitudinally upon itself as shown in Fig. 6, and thereupon twisted as shown in Fig. 7. The string may also be formed of spun and twisted cellulose wood fibers 12b as shown in Fig. 8, or it may consist of a continuous cellulose filament 12c, as shown in Fig. 9, capable of disintegrating when saturated or partially saturated with moisture. Other suitable and functionally equivalent material may be used in carrying out the purposes of the invention. In order to protect the string against water or moisture during the tying operation it is provided with a protective coating 13, consisting of a suitable moisture impervious material which will remove itself from its protecting relation with the string by melting, evaporating, cracking-off, or the like when subjected to a predetermined heat, or when subjected to a predetermined heat in the presence of moisture, as will presently hereinafter more fully appear.

A suitable coating for this purpose is resin, resinous wax, shellac, and the like. It will be understood that any other coating materials having similar characteristics may be employed.

The next step consists in smoking the length of filled link sausage, this operation being a dry operation wherein the sausage is exposed for a certain period to wood smoke produced from hickory or similar wood, saw dust, shavings and the like. The temperature during this operation is relatively high and is of such order that the sausage reaches a temperature at its core of approximately 140° F., this temperature being usually determined by testing with a thermometer inserted into one of the sausage links. The effect of the smoking operation is to cook or partially cook the sausage filling, and more particularly to color and to solidify and set the form of the sausage links. The smoking operation also has the effect of slightly shrinking the sausage link as it becomes solidified so that the annular creases between the link ends tend to open up and thereby more or less release the tie strings from the compressive action of the creases, as shown in Fig. 2, and exposes a greater surface of the string to the atmosphere, as shown in Fig. 3. Thus during the smoking operation the protective coating 13 may be such as to melt, evaporate, crack-off, or otherwise be affected by the high temperature of the smoking operation, so that the body of the string will no longer be protected against the disintegrating effect of moisture. However, in certain cases the protective coating may be of such a nature that it will remain intact under the relatively high smoking temperature, being subject to melting, evaporating, cracking-off, or otherwise disintegrating when exposed to a temperature higher than the smoking temperature, or when exposed to a given high temperature in the presence of moisture, that is a temperature substantially higher than the temperature of the water employed during the first step of filling and tying.

The next step consists in steam cooking the length of link sausage, this being a wet operation at a relatively high temperature, the superficial temperature of the steam being of the order of about 212° F. During this step the coating upon the string melts off, evaporates, cracks-off, or otherwise disintegrates, unless, as stated above, this takes place either partially or entirely during the smoking operation. In any case the body of the string becomes exposed to the moisture of the steam and thereupon disintegrates to the point where it no longer constitutes an effective tie. The cooked length of link sausage is then subjected to a washing operation during the course of which any remaining particles of pulp or paper will be washed off. If any small particles of pulp or paper remain they will not constitute a serious obstacle to the subsequent skinning operation as they will in no way form a restriction at the ends of the links, and the link sausage will be protected by the casing 10 from contact of the pulp or paper particles as well as any residue from the protective coating. The length of link sausage with the tie strings removed can now be skinned by any of the usual methods, either manual or automatic.

I have illustrated and described preferred and satisfactory embodiments of the invention, but it will be understood that changes may be made therein within the spirit and scope thereof, or defined in the appended claims.

What is claimed is:

1. In combination, a length of link sausage comprising a tubular casing stuffed with sausage ingredients and tie-strings at intervals along said stuffed casing constricting it to produce a series of connected links, said tie-strings consisting of a body of moisture disintegratable material, and a moisture resistant heat disintegratable protecting coating, said body being substantially free of impregnation by said coating.

2. In combination, a length of link sausage comprising a tubular casing stuffed with sausage ingredients and tie-strings at intervals along said stuffed casing constricting it to produce a series of connected links, said tie-strings consisting of a body of moisture disintegratable cellulose material, and a moisture resistant heat disintegratable protecting coating, said body being substantially free of impregnation by said coating.

3. The method of forming a length of link sausage and removing the link forming ties therefrom which consists in stuffing a tubular casing with sausage ingredients, and applying tie-strings at intervals along said stuffed casing constricting it to produce a series of connected links, and said tie-strings having a body of moisture disintegratable material and having a protective moisture resistant heat disintegratable coating protecting said body from contact of moisture during the link tying step, said body being substantially free of impregnation by said coating, subjecting the link sausage to a sausage making high temperature step capable of disintegrating said coating, and subjecting the body of the string to moisture to disintegrate it.

References Cited in the file of this patent
UNITED STATES PATENTS

| | | |
|---|---|---|
| 35,262 | Rhodes | May 13, 1862 |
| 87,005 | Semple et al. | Feb. 16, 1869 |
| 1,964,011 | Vogt | June 26, 1934 |
| 2,216,045 | Powers et al. | Sept. 24, 1940 |
| 2,331,955 | Beebe et al. | Oct. 19, 1943 |
| 2,332,020 | Simpson | Oct. 19, 1943 |